United States Patent [19]

Cochran

[11] 4,372,455
[45] Feb. 8, 1983

[54] THIN WALLED PLASTIC CONTAINER CONSTRUCTION

[75] Inventor: Donald D. Cochran, Bartlett, Ill.

[73] Assignee: National Can Corporation, Chicago, Ill.

[21] Appl. No.: 318,051

[22] Filed: Nov. 4, 1981

Related U.S. Application Data

[63] Continuation of Ser. No. 113,176, Jan. 18, 1980, abandoned.

[51] Int. Cl.³ .............................................. B65D 1/02
[52] U.S. Cl. ............................. 215/100 A; 215/1 C; 220/72
[58] Field of Search ............. 215/1 C, 100 A; 220/72

[56] References Cited

U.S. PATENT DOCUMENTS

| | | | |
|---|---|---|---|
| D. 205,730 | 9/1966 | Platte. | |
| D. 219,863 | 2/1971 | Beaver | D9/378 |
| 4,046,275 | 9/1977 | Virog et al. | |
| 4,113,095 | 9/1978 | Dietz et al. | 220/72 X |
| 4,127,206 | 11/1978 | Virog et al. | |

OTHER PUBLICATIONS

Bottle No. 1, Hinkley and Schmitt, Inc., 1974.
Bottle No. 2, Dean Foods Company, 1976.
Bottle No. 3, milk container, 1971.

*Primary Examiner*—Donald F. Norton
*Attorney, Agent, or Firm*—Robert A. Stenzel

[57] ABSTRACT

A lightweight plastic container having improved strength and rigidity characteristics for a given amount of plastic material is provided. The container is of one-piece thin-walled construction having four generally flat sidewalls interconnected by curved corner portions and having a bottom portion interconnected to the flat sidewalls by curved base portions and further having an integral handle formed within the bottle profile. The container incorporates a pair of longitudinally extending ribbing structures in a pair of opposed curved corner portions and other inventive constructional features enabling the lightweight container to withstand hydrostatic forces without buckling or dimpling as well as heavier conventionally constructed plastic containers.

62 Claims, 25 Drawing Figures

U.S. Patent  Feb. 8, 1983  Sheet 1 of 5  4,372,455
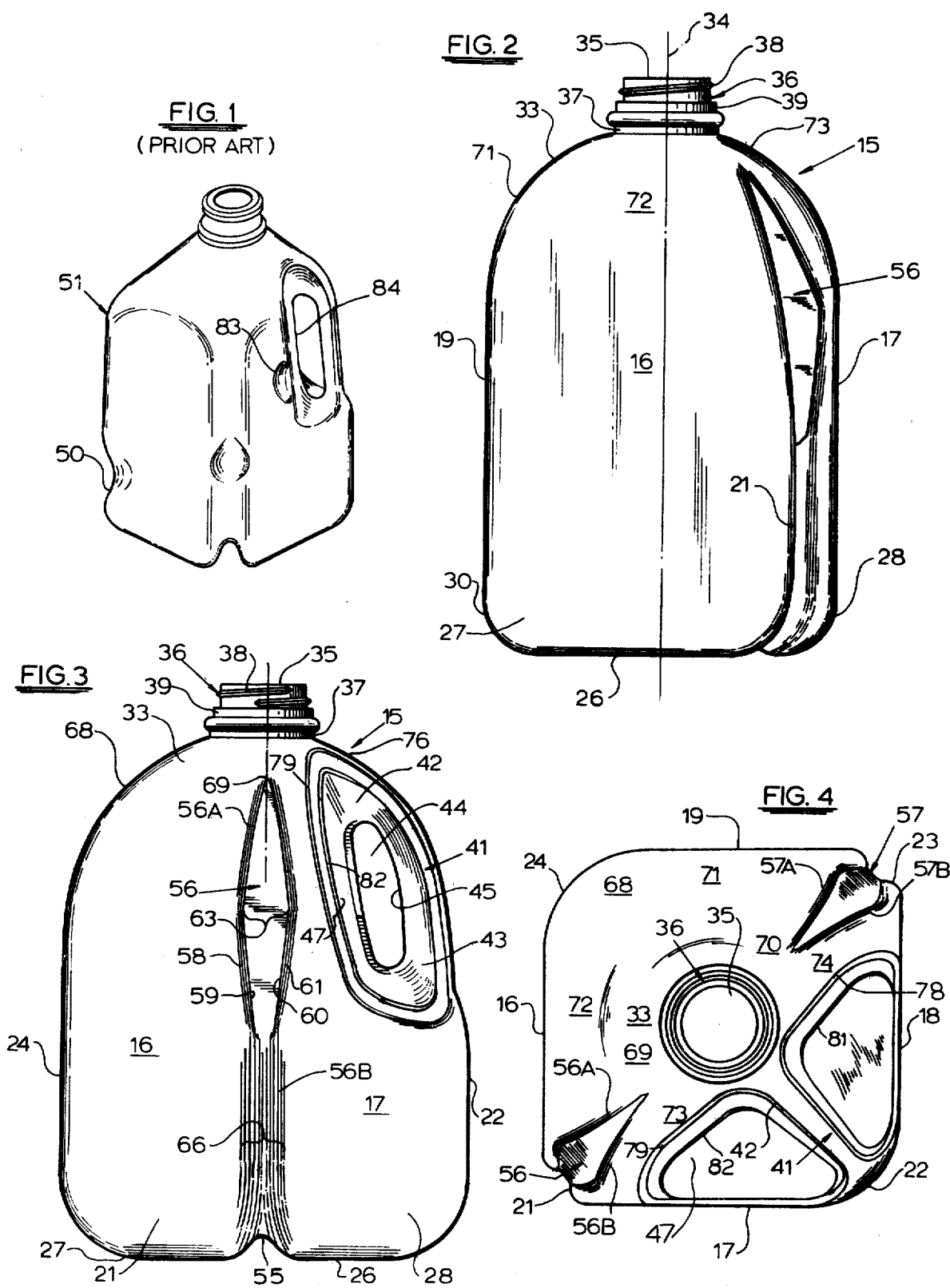

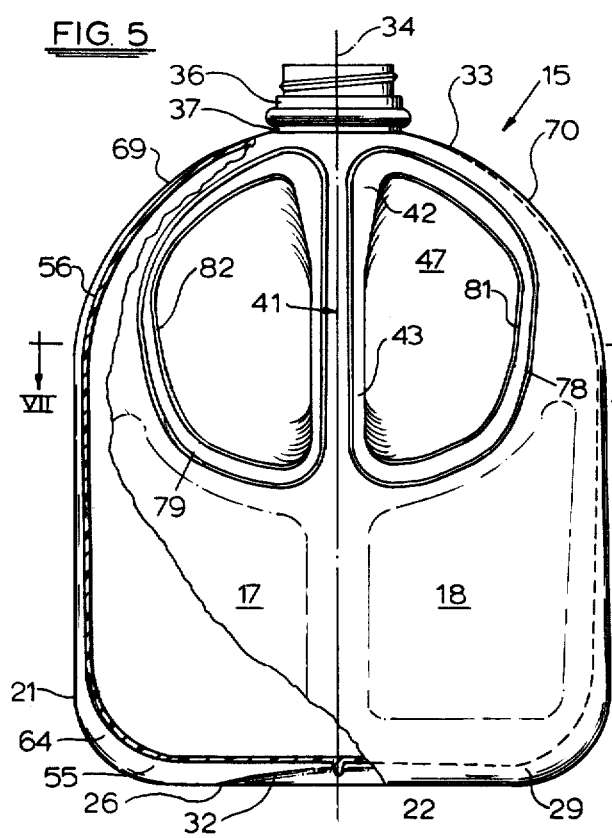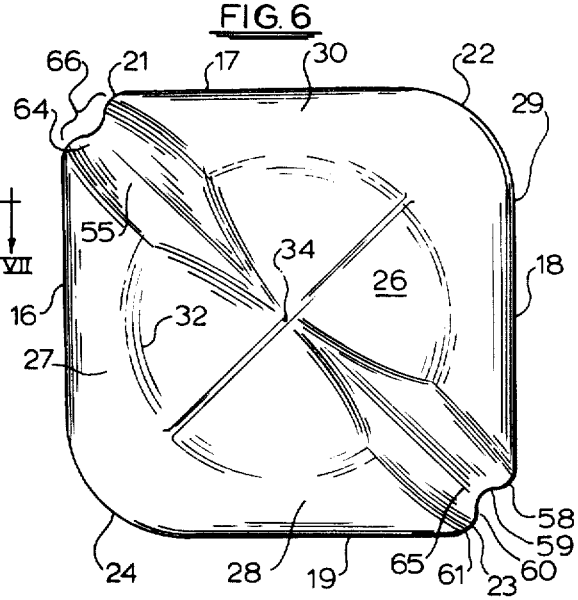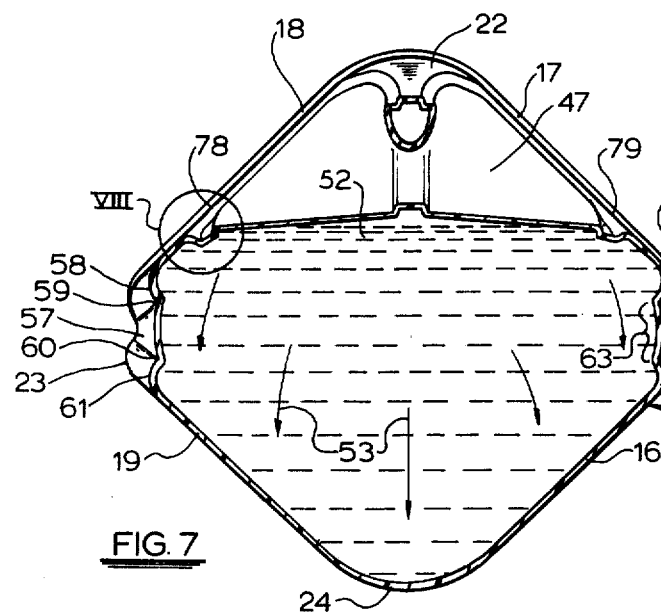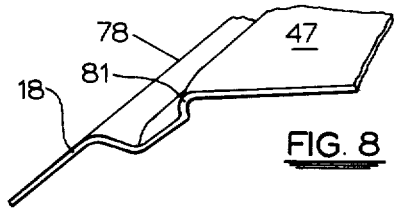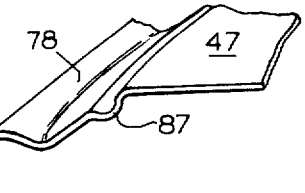

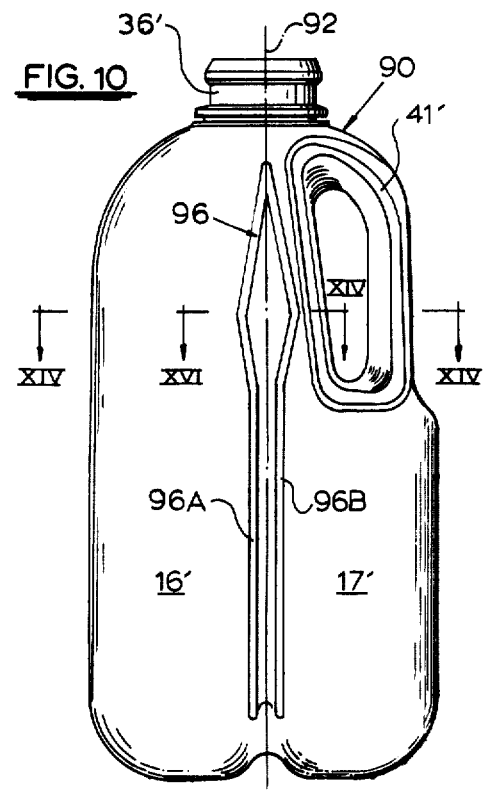
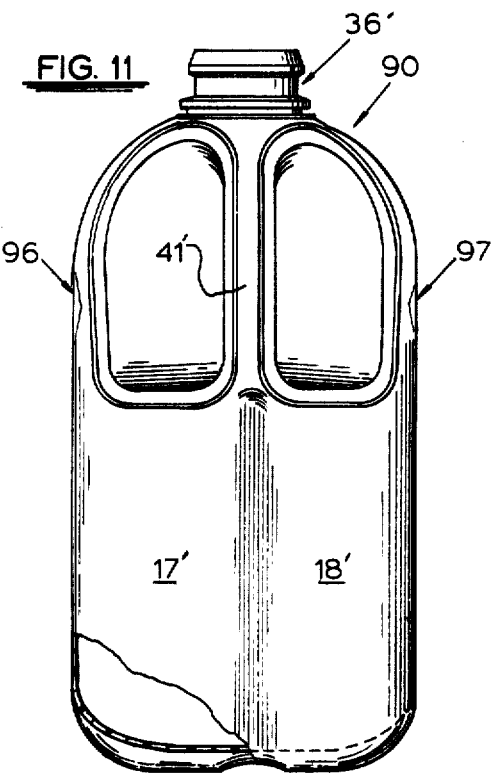
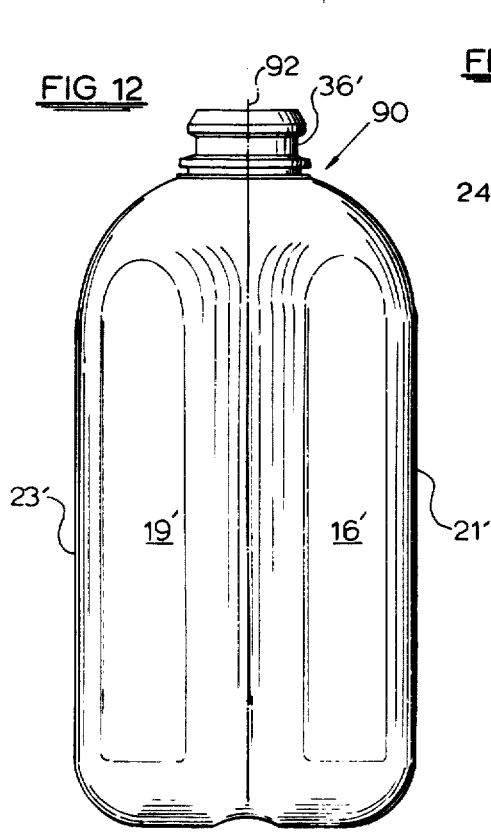
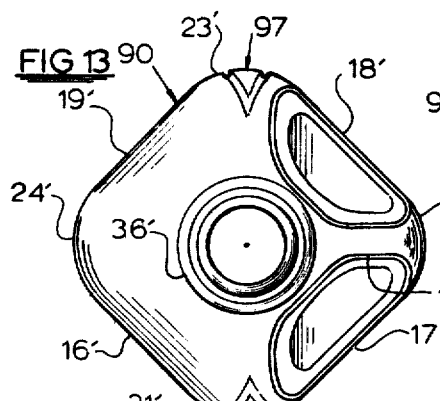
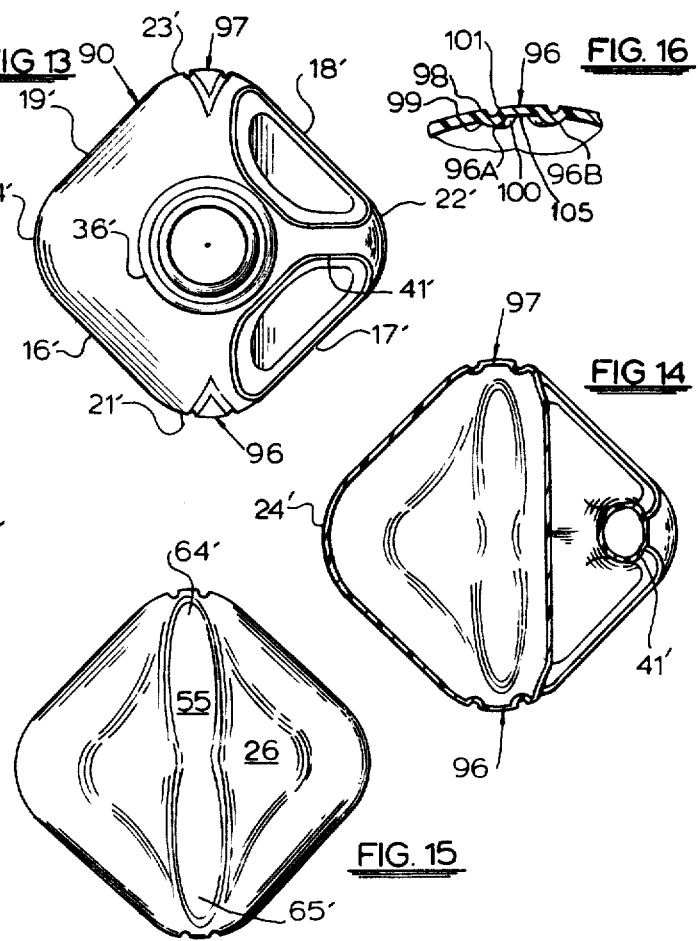

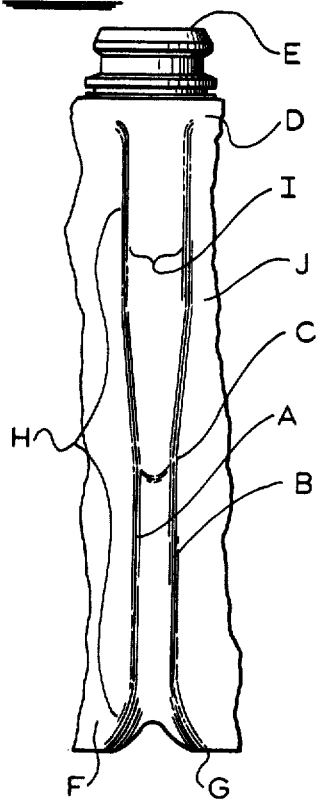
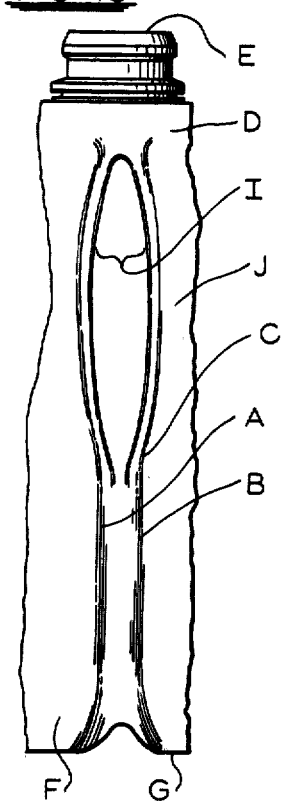
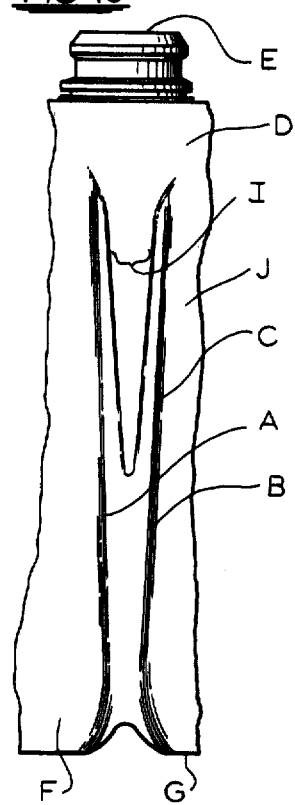
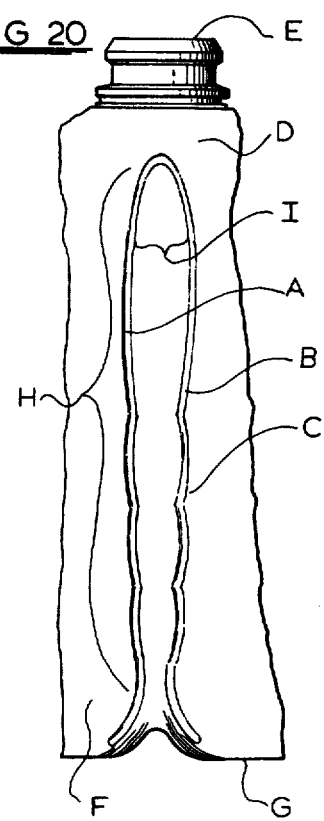
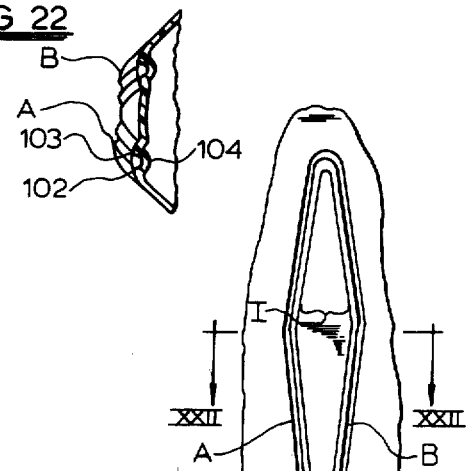
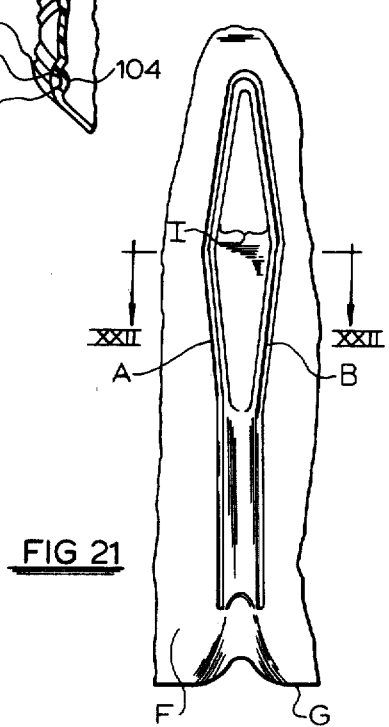

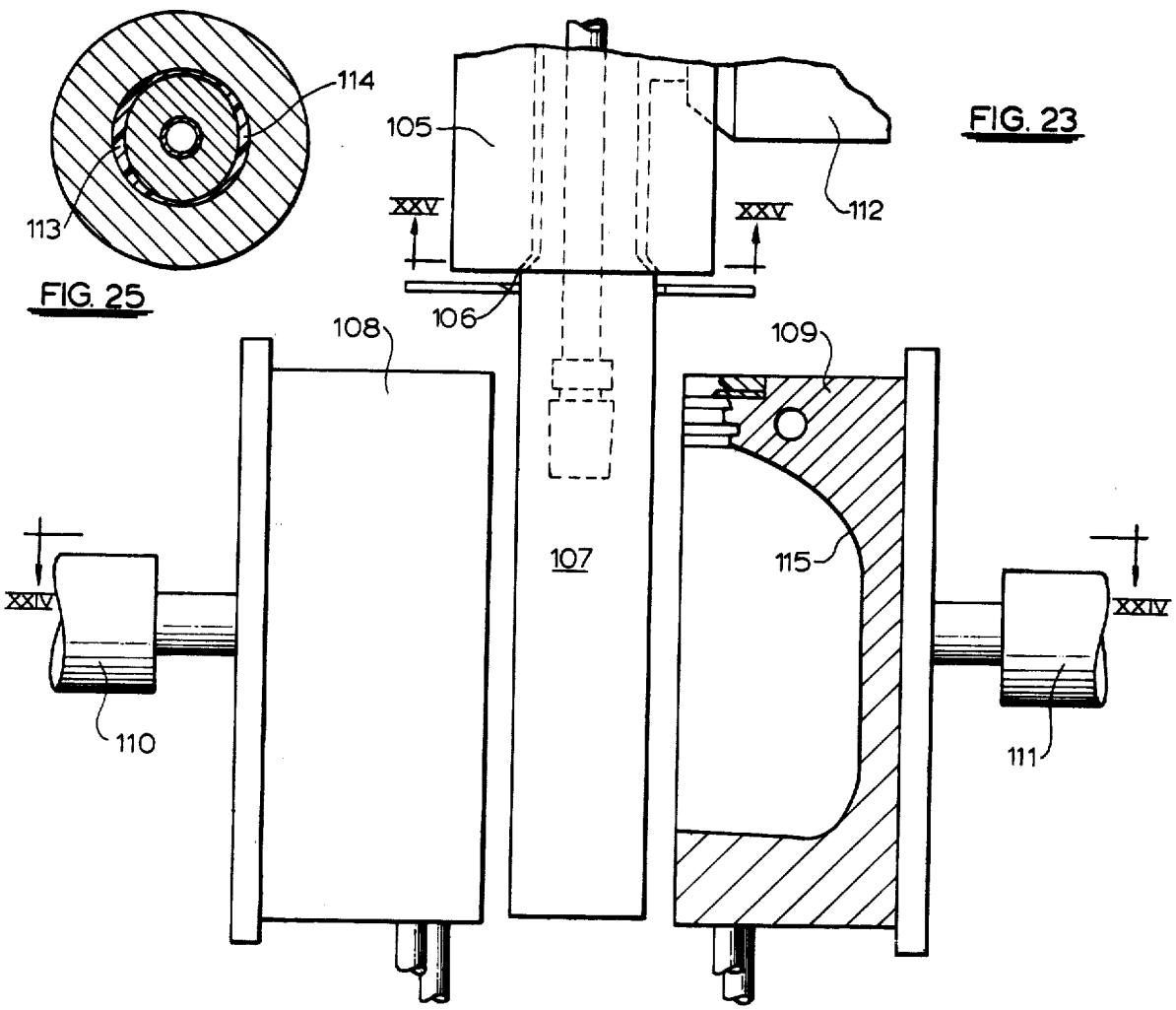
FIG. 25
FIG. 23
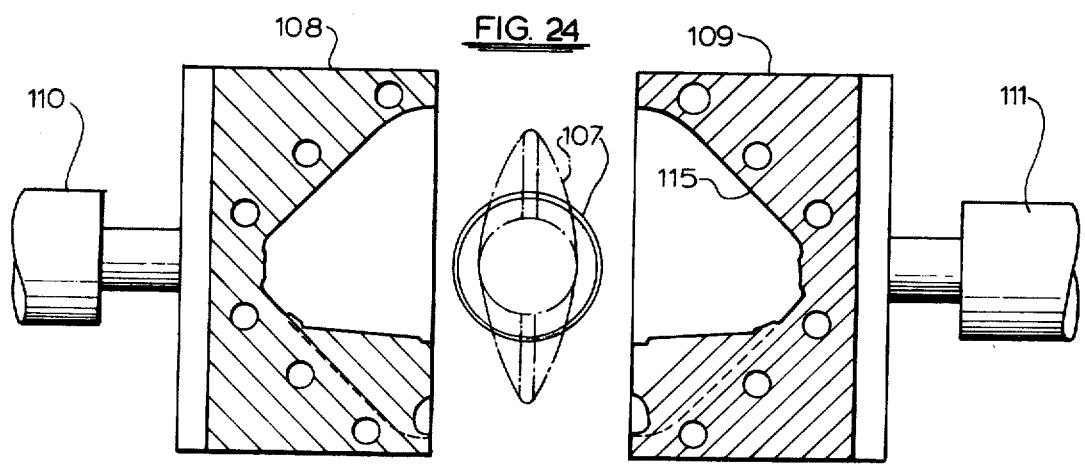
FIG. 24

THIN WALLED PLASTIC CONTAINER CONSTRUCTION

This application is a continuation of Ser. No. 113,176, entitled "Improved Thin Walled Plastic Container Construction," filed Jan. 18, 1980, and commonly assigned herewith and now abandoned.

BACKGROUND OF THE INVENTION

Plastic containers have now come into wide-spread usage as vessels for liquids, such as milk and the like, often substantially completely replacing glass bottles and the like. Certain types of plastic containers have been found to be more suitable than other types of plastic containers for use in applications wherein a relatively high degree of mechanical and automated processing is involved, such as automatic filling procedures.

In this connection, plastic containers of a one-piece blow-molded construction having four generally flattened sidewalls interconnected by curved corner portions have come into wide public use. The handle is integral with the container and constructed as to not extend beyond the side elevational profile of the container in any given direction so that regardless of how the container is fed into a holder, automatic filling device, or the like, the container handle does not interfere with container utilization. Such a container has associated with it a high degree of standardization as respects size, mouth location, internal volume, etc.

As the cost of the thermoplastic resins increases with the rising costs of petroleum (many thermoplastic resins being comprised of one or more components derived from petroleum directly or indirectly), an increasingly important need arises to cut the cost of the plastic containers. One way to reduce cost is to reduce the quantity of plastic required in a given plastic container without adversely affecting the strength and rigidity characteristics thereof. Since a great deal of capital investment has been made in, for example, automated equipment adapted to use plastic containers having generally flattened sidewalls, it would be highly desirable to reduce the amount of plastic required in such a type of container without adversely interfering with the strength and rigidity requirements thereof.

Production of lightweight bottles has been achieved generally only by reducing surface wall thicknesses. However, the thinner the walls the more susceptible they become to failure from normal hydrostatic forces exerted upon a filled container. The lightweight containers presently available have gone as far as they can in reducing bottle weights in this manner. Below the present levels of minimum weight, failures, usually in the form of surface creases or kinks, would regularly develop as the result of hydrostatic forces in filled bottles. These failures do not always lead to rupture or spillage; however, any kinking or other type of distortion in a plastic container construction is undesirable. For one reason, it tends to represent a weakness or potential for breakage in the mind of consumers, thereby negatively affecting the salability of the container and its product.

SUMMARY OF THE INVENTION

The present invention is directed to plastic containers which can be blow molded and which are of one piece relatively thin walled construction having four generally flat sidewalls interconnected by curved corner portions and having a flattened bottom portion which is interconnected to the flattened sidewalls by curved base portions. Such containers have associated with them an integral handle fabricated within the container profile and located along a curved corner portion thereof.

The plastic container construction of this invention is characterized by improved strength and rigidity characteristics for a given amount of plastic material employed in the fabrication thereof, without interfering with the previously established standards of configuration for adapting the container to particular automated end use applications, such as packaging, filling and the like.

One particular objective of the present invention is to provide a container construction which can be fabricated having a relatively reduced quantity of plastic employed in the construction and fabrication thereof, compared to corresponding plastic containers of equivalent capacity as known to the prior art which are fabricated with similar plastic materials, without sacrificing desirable strength and rigidity characteristics.

Another advantage of the present invention is to reduce the costs of operating a blow molding plastic container plant by achieving reductions in the amount of polymer or resin needed to make containers.

Another object is to improve the cycle time for bottle making in a machine of the extrusion blow molding type having a fixed maximum rate for plastic throughput per hour.

Another object of the present invention is to provide improved techniques for the making of plastic containers, particularly containers having a total content of plastic approaching minimum possible levels consistent with rigidity and strength considerations.

Other further objects, aims, advantages, features, structures and the like will be apparent to those skilled in the art from the teachings provided by the present specification taken with the accompanying drawings.

BRIEF DESCRIPTION OF THE DRAWINGS

FIG. 1 is a perspective view of a prior art container formed of a thermoplastic material.

FIG. 2 is a side elevational view of one embodiment of a thin walled plastic container construction of the present invention.

FIG. 3 is a view similar to FIG. 2, but with the container shown in FIG. 2 rotated 45°.

FIG. 4 is a top plan view of the container embodiment shown in FIGS. 2 and 3.

FIG. 5 is a side elevational view of the container embodiment shown in FIGS. 2 through 4, but with the container rotated 90° with respect to the embodiments shown in FIG. 3, some parts thereof broken away and some parts thereof shown in section.

FIG. 6 is a bottom view of the embodiment shown in FIGS. 2 through 5.

FIG. 7 is a cross-sectional view taken along the lines VII—VII of FIG. 5 showing the container embodiment supported by the handle thereof in a pouring mode dispensing a liquid, this Figure illustrating the weight distribution on the container embodiment during pouring.

FIG. 8 is an enlarged fragmentary detailed sectional view taken in the region VIII of FIG. 7.

FIG. 9 is an enlarged detailed sectional view similar to the view shown in FIG. 8, but showing an alternative embodiment of the present invention taken in the same region VIII of FIG. 7.

FIG. 10 is a side elevational view of another embodiment of a container construction of the present invention.

FIG. 11 is a view similar to FIG. 10, but with the container construction of FIG. 10 rotated 90° from its position shown in FIG. 10, some parts thereof broken away and some parts thereof shown in section.

FIG. 12 is a view similar to that shown in FIGS. 10 and 11 but with the container embodiment shown being rotated 180° from its position shown in FIG. 11.

FIG. 13 is a top plan view of the container embodiment shown in FIGS. 10–12.

FIG. 14 is a sectional view taken along the line XIV—XIV of FIG. 10.

FIG. 15 is a bottom view of the container construction shown in FIGS. 10–14.

FIG. 16 is an enlarged fragmentary sectional view taken generally along the line XVI—XVI of FIG. 10.

FIG. 17 is a fragmentary view in the area of curved corner portion showing a modified form of a ribbing structure.

FIG. 18 is a view similar to FIG. 17, but showing another modified form of a ribbing structure.

FIG. 19 is a view similar to FIG. 17, but showing another modified form of a ribbing structure.

FIG. 20 is a view similar to FIG. 17, but showing another modified form of a ribbing structure.

FIG. 21 is a view similar to FIG. 17, but showing another modified form of a ribbing structure.

FIG. 22 is a sectional view taken along the line XXII—XXII of FIG. 21.

FIG. 23 is a diagrammatic side elevational view of a type of extrusion blow molding apparatus with some parts thereof broken away and some parts thereof shown in section, which may be used to manufacture a container construction of the present invention.

FIG. 24 is a diagrammatic sectional view taken along the line XXIV—XXIV of FIG. 23.

FIG. 25 is a diagrammatic sectional view taken along the line XXV—XXV of FIG. 23.

DESCRIPTION OF THE PREFERRED EMBODIMENT

FIG. 1 shows a conventional prior art blow-molded, one-piece plastic bottle container 51, which is gallon size and will be referred to hereinafter for comparison purposes. The bottle 51 is of a square plan profile, has four flat side-walls interconnected by curved corner portions, and is integrally formed with a handle along one corner. Referring to FIGS. 2 through 8 there is shown a gallon size bottle embodiment of a container construction of the present invention herein designated in its entirety by the numeral 15. Container 15 is prepared by conventional blow molding technology and consists of a one piece thin walled construction having generally four flat side-walls designated, respectively, as 16, 17, 18 and 19 and interconnected by curved corner portions designated, respectively, as 21, 22, 23 and 24. The sidewalls and curved corner portions together in combination form a generally squared configuration when viewed in longitudinal section or in top plan view (see, for example, FIG. 4 or FIG. 7). Container 15 includes a bottom portion 26 which is interconnected to the respective sidewalls 16, 17, 18 and 19 by respective curved based portions 27, 28, 29 and 30. The bottom portion 26 has a centrally located dished or concave section 32.

Each of the flat sidewalls 16, 17, 18 and 19, and the curved corner portions 21, 22, 23, and 24 are connected along their top edge portions to a domed or conically tapered portion 33. Container 15 is thus generally symmetrically arranged around a longitudinal axis 34, and the conically tapered section 33 terminates in a mouth section 35 which is generally symmetrically positioned about the longitudinal axis 34. The region immediately adjacent the mouth section 35 is formed into a neck region 36 which is integrally connected at its base 37 with the main body of the conically tapered section 33. The sidewall portions of the neck region 36 have formed therein flanged members whose configuration depends upon the exact type of closure means to be used with the container 15. Here, these flanges define a screw thread 38 as well as a locking flange arrangement 39.

The curved corner portions 22 is modified so as to incorporate a hollow handle 41 integrally into the container 15. Respective upper and lower end portions 42 and 43 of handle 41 are integrally associated with adjoining portions of the container 15 leaving an open region 44 between the central portion 45 of handle 41 and a panel or handle backing section 47 so as to provide a manual gripping location for a user of the container 15. The lower end 43 of the handle is connected with an upper portion of the curved corner portion 22. The handle backing section 47 is a relatively raised planar surface inclined relative to axis 34 and extending between adjacent sidewalls 17 and 18 in its lower regions. In its upper regions, the section 47 extends upward through much of the dome 33. On either side of the handle 41 a canting is provided with the section 47 sloping laterally away from the immediate region of handle 41 on each side thereof.

Such a square sided container 15 is contemporarily widely used for the bottling of beverages, such as milk and the like. For one thing, a container 15, with its square sides, is readily adapted for storage and shipment. For another thing, such a container 15 is well-adapted for filling mechanically, permitting use of a container 15 in automated and semiautomated filling and loading operations. Round, or cylindrically sided, containers contemporarily typically do not conform to various specifications concerned with container usage and storage.

In practice, one can identify two classes of forces which are exerted upon a liquid filled container 15. One class of forces concerns those of compression which are exerted in opposing directions along the longitudinal axis 34. Another class of forces is concerned with the laterally developed forces exerted upon a container 15 which are particularly apparent when the container 15 is tilted during container unloading or pouring.

Largely because of the necessity for a generally square plan profile container configuration, such as is associated with container 15, for use in established automatic equipment, storage racks, and the like, it is necessary that the handle 41 be entirely self-contained within the square-type container profile. Thus, for the type of container construction hereinvolved, the handle associated with a given container does not appreciably protrude beyond the corner profile associated with the container. However, as those skilled in the art will appreciate, it is possible to reduce a given corner dimension of a container, such as container 15, without interfering with the ability of such container to be used in standardized automated equipment, unloading racks, or the like, as those skilled in the art will appreciate. Thus, in the case of container 15, which represents a preferred embodiment of the present invention, the corner portion 24 is here provided with a greater lateral radius, or wider plan profile, than that associated with opposed corner portion 22, it being substantially equal with the remaining corner portions 21 and 23. Thus, the center for the radius associated with corner portion 24 is shifted towards axis 34 relative to the position of the center for the corner portion 22, thereby causing the corner portion 24 to approach a more cylindrical configuration in section. The advantage of the curvature so associated with the corner portion 24 is that a greater radius of curvature reduces the tendency in the container for the corner portion 24 to develop a kink, such as the kink 50, shown in the prior art container 51 depicted in FIG. 1.

Thus, for example, referring to FIG. 7, it is seen that the affect of the larger radius of curvature associated with the corner portion 24 is to produce a fuller plan profile area of support for fluid 52 being dispensed from the container 15. As illustrated by arrows 53, during inclination of the container 15, the weight of the fluid 52 is exerted downwardly which would, but for the wide curvature of corner portion 24, tend to produce a corner kink, such as illustrated by kink 50 in container 51. If the corner 24 had a sharper radius, there would also be a tendency for a bulging action to occur in the sidewalls 16 and 19 adjacent to the corner 24 which is considered undesirable. Although there is no mechanical structural relationship required, it is generally preferred not to have a radius of curvature for corner portion 24 which is in excess of three times the radius of curvature associated with each of the corners 21–23, these radii each being generally equal.

The bottom portion 26 is connected to the sidewalls and corner portions by corresponding curved base or chime portions 27, 28, 29, and 30. A trough configuration 55 is defined in the bottom portion 26, which extends diagonally between the corner portions 21 and 23 adjacent the handle corner portion 22. In addition, the trough configuration extends into the curved base or chime portions 27, 28, 29 and 30 in the regions where these portions adjoin one another at the corner portions 21 and 23, respectively. The exact position and depth of the trough configuration 55 in any given container construction is somewhat dependent upon mold and molding considerations, but, in general the trough is most shallow in the central portion of the dished section 32 in the region of the longitudinal axis 34. Indeed, the trough configuration can end or be discontinuous in the region of axis 34 as respects its existence in the dished section 32 at the location of the longitudinal axis 35, if desired, as those skilled in the art will appreciate.

In container 15, a ribbing structure generally indicated by the numeral 56 and 57, respectively is defined in and along each one of the corner portions 21 and 23. Each ribbing structure 56 or 57 is characterized by having associated with it two sharp surface discontinuities or ridge line members 56A and 56B, and 57A and 57B. Each ridge member, for example, member 56A is formed by, at least, two changes or reversals of radius of curvature formed in the wall of container 15 as one proceeds perimetrically around container 15 perpendicularly to its axis 34. Each such radius reversal involves a change in the radius of curvature locally of respective corner portions 21 and 23. Each ribbing structure 56 or 57 employs collectively four such localized changes in curvature, which are marked, in the case, for example for ribbing structure 56, by the numerals 58, 59, 60, and 61 as seen, for example in the sectional view shown in FIG. 7. A lateral spacing, being of a recessed generally continuous or smooth exterior wall surface, is set between the pair of ridge line members at each ribbing structure. Each set of ridge line members, such as 56A and 56B, is characterized by extending longitudinally along its respective curved corner portion, such as 21, in a matching or symmetrical fashion with one another. The matching ridge line members run upwardly across from one another in non-decreasing fashion for a substantial length of the corresponding ribbing structure 56 and 57.

Each ribbing structure 56 or 57 is distended or spread laterally adjacent the middle region of the handle 41 (in lateral view) relative to the lateral width of such a ribbing structure in regions below the lower end portion 43 of handle 41 and above the bottom portions 27, 28, 29, and 30. This localized spreading is shown in container 15 at position 63 which is a preferred position situated in the region where the bottom portion of this dome section interconnects with adjacent top edge portions of sides 16 and 17. This localized spreading serves to provide a maximum of strength for load support purposes at areas that can be inherently or characteristically weak in a container 15 which is made by conventional extrusion blow molding procedures. When, for example, the container 15 is tilted, for instance, into the horizontal position shown in FIG. 7, substantially no distortion of the configuration of the container 15 occurs. The forces developed during such a tilting tend to produce a spreading action in the corner portions 21 and 23 which can be offset and substantially completely overcome by the structure and configuration associated with the ribbing structures 56 and 57.

A somewhat different force analysis exists in the case of the container 15 below the region of handle 41. When the container 15 is in a vertical position and loaded, the configuration of a ribbing structure 56 or 57 is such that a stiffening action occurs which tends to resist a spreading of the corner portions 21 and 23 during normal storage. Also, the ribbing structures 56 and 57 give added compressive strength to a container 15 when such a container, while loaded, is subjected to compressive surfaces in opposed directions along the longitudinal axis 34 thereof. The changes in curvature 58, 59, 60, and 61, for example, tend to resist alterations in container 15 structure in response to compressive forces.

As shown in container 15, the lower portion of each ribbing structure 56 or 57 in the region thereof below handle 41 and above base sections 27, 28, 29 and 30 is generally continuous with the upper portion of the ribbing structures in regions thereof generally corresponding to the location of handle 41 (when the container 15 is viewed in side elevation). Also, each of the ribbing structures 56 and 57 joins with the outside opposed end portions 64 and 65 of the trough configuration 55 which provides a combination imparting added strength and rigidity to a container 15.

In general, in a preferred embodiment of a container of the present invention, such as in container 15, the spread 63 (associated with the widest portion of a ribbing structure such as 56) is at least one and half times greater than the spread 66 associated with the narrower portion of such ribbing structure below the level of the handle 41. The upper end of a ribbing structure 56 or 57 terminates in the domed section 33 in spaced relationship to the neck region 36 and in the region where the upper end portion 42 of handle 41 connects with the domed or conically tapered section 33.

Another feature of the container 15 lies in the radius of curvature associated with the conically tapered section 33 at different points around the perimeter thereof. Thus, in the regions where the domed section 33 joins the curved corner portions 21, 22 and 23, the radius of curvature is greatest, while, in the regions where the domed section 33 joins the top edge of each sidewall 16, 17, 18 and 19, the radius of curvature of the domed section is at its maximum extent. In general, the ratio of the radii of curvature for domed section 33 in the region of the corner portions 21, 24, and 23 to the radii of curvature of domed portion 33 in the central region of each sidewall 16, 17, 18 and 19 falls in the range from about 2.5 to 1, though larger and smaller values can be used without departing from the spirit and scope of this invention. For convenience, the radii of curvature associated with the domed portion 33 in the region of curved corner portions 21, 24 and 23 is designated by the respective numerals 68, 69 and 70, respectively. Similarly, the radius of curvature associated with the domed or conically tapered section 33 in the region of the sidewalls 16, 17, 18 and 19 is designated by the respective numerals 71, 72, 73 and 74, shown in FIG. 4. In this region of handle 41, however, the radius of curvature associated with the outside wall 76 of handle 41 does not need to conform to the radius of curvatures 68, 69 and 70, as those skilled in the art will appreciate. The changes in radius of curvature as one proceeds parametrically around the outside of conically tapered section 33 in a direction perpendicular to the longitudinal axis 34 provide added strength and rigidity for a given container construction 15.

In order to provide a desirable degree of rigidification in container 15 in the region of handle 41 thereof, and of handle panel section 47, a ribbing arrangement is imparted to the container 15 so as to provide a pair of ribbing structures 78 and 79, each one of such ribbing structures 78 and 79 extending on opposed side portions of the handle 41, and each such ribbing structure 78 and 79 forming a separate continuous loop forming upraised sidewall edge surfaces for the panel section. Each ribbing structure 78 and 79 is characterized by having at least two localized changes in curvature (of contour). Preferably as shown in container 15, there is formed inward of each ribbing structure 78 and 79 a further surface discontinuity in the form of semi-circular length arc beads 81 and 82 located over and along the lateral outer edge surfaces of the panel section 47. For purposes of the present invention, a bead extends in the general shape of a semicircular arc and can be regarded as an outward or inward projection on a localized basis of the container wall. A bead can be formed without thickening the wall in a localized area. The respective ribbing structures 78 and 79 impart to container 15 added strength and rigidity which is particularly useful when the container is being inclined during discharging of container contents or the like, as those skilled in the art will appreciate. The added strength tends to prevent a localized dimpling from occurring such as has been experienced with prior art containers, such as container 51 wherein dimples 83 have been observed to occur in the region where the handle backing section 47 thereof joins the main body profile thereof.

A raised projection configuration for the bead structure 81 is shown, for example, in FIG. 8. The bead 81 is conveniently formed by a wire-like shape or the like set in the forming mold. In contrast, an alternative inward projecting bead arrangement 87 is shown in FIG. 9, where the bead 87 is conveniently formed by grooving the forming mold. Thus, each half of a two piece forming mold is appropriately shaped to provide a ridge line discontinuity about the panel 47 and thereby produce the bead.

As those skilled in the art will appreciate, a container 15 can be prepared by conventional extrusion blow molding using a resin comprised of a polyolefin, such as polyethylene, polypropylene, or the like. The construction of the mold used to fabricate a container 15 may be conventional, if desired.

The container 15 construction, for a given quantity of plastic material, produces a stronger and more rigid product container than is associated with the prior art, for example, container 51 in FIG. 1. Because of such increases in rigidity, strength, and the like, it is possible to fabricate a container 15 using a smaller total weight of plastic than would otherwise be necessary to produce a container with corresponding strength and rigidity, such as a container 51 shown in FIG. 1. Indeed, a substantial plastic material weight savings on an individual container 15 basis can be achieved through the practice of the invention.

For example, weight reductions in total quantity of plastic employed can range characteristically from values extending from about 20% to even more than 50% in total container weight, though smaller and greater such percentage reductions can be achieved without departing from the spirit and scope of this invention.

Referring to container 15, it will be appreciated that such is readily fabricatable by conventional extrusion blow molding procedures which tend to characteristically produce a blow mold parting line at opposing curved corner portions 21 and 23. Because of the positioning of the handle 41 and the relative inflexibility of a given container 15 in the blow mold during the formative process, the corner portions 21 and 23 are fixedly positioned in the blow mold whereas the adjacent corners 22 and 24 can expand outwardly away from the longitudinal axis 34. This drawing out action tends to produce a thin walled structure in the region of maximum spread 63 in the region of corner portions involving the ribbing structures 56 and 57. As a result of this tendency for thin walls, the ribbing structures 56 and 57 are adapted to compensate for this inherent thinning of container 15 walls which occurs during the blow molding manufacturing process.

In the case of these ribbing structures, it is preferred to have the bottom trough be of generally minimum width with respect to sidewall radius of curvature changes forming such ribbing structure in order to prevent spreading action which would induce dimpling, or like container wall distortions. The region of maximum spread in a ribbing structure 56 or the like is preferably placed in the region where the dome 33 joins the sidewalls 16, 17, 18 and 19.

Turning to another embodiment of the invention, which is likewise preferred, reference is made to FIGS. 10 through 15, wherein a half-gallon bottle container embodiment of the present invention is designated in its entirety by the numeral 90. In container 90, there is seen a construction which includes a sidewall and curved corner components, etc., which are similar to those associated with container 15 and which are similarly symmetrically arranged with respect to a longitudinal axis 92. For purposes of simplicity of description, those portions of container 15 which are similar to those of container 90 are similarly numbered but with the addition of prime marks thereto.

The container 90 incorporates another embodiment of ribbing structures 56 and 57 as used in container 15. In container 90, these ribbing structures are identified by the respective numerals 96 and 97. Each such ribbing structure 96 and 97 is characterized by having two ridge lines, such as 96A and 96B. Each member, such as 96A, has four abrupt changes in curvature, as shown, for example, in FIG. 16 and as designated by the respective numerals 98, 99, 100, and 101. The mid-region or lateral spacing 105 between members 96A and 96B conforms with the exterior contour configuration of the respective curved corner portion 21'. As in the case of a gallon-size container construction described above, intermediate spacing between the two ridge line members for each ribbing structure, such as 96 (for example), runs upwardly along a substantial length of the respective curved corner portion in nondecreasing fashion and is greatest in the lower region of the handle 41' (viewed from lateral profile) while the ribbing structure 96 has a reduced lateral extension in regions thereof which lie below the handle 41. The ribbing structures 96 and 97 provide similar benefits and advantages to those obtained with the ribbing structure 56 and 57 of container 15, as those skilled in the art will readily appreciate.

Like container 15, container 90 affords similar advantages of rigidity and strength which permit one to produce a lightweight container incorporating thereinto reduced amounts of plastic material as compared with comparable containers known in the prior art.

As those skilled in the art will readily appreciate, the container 15 has an exterior configuration which renders it particularly suitable for use as a one gallon milk container; while the exterior configuration associated with the container 90 make it particularly well suited for use as a one-half gallon milk container.

The type of ribbing structures 96 and 97 employed in container 90 tend to be a most preferred construction in the container of the present invention because it appears that such ribbing structures 96 and 97 can be produced with a minimum of mold fabrication cost. The spacing of the region of maximum spread along each corner ribbing structure is chosen so as to prevent such spread from being so great as to induce a dimpling action in a given container configuration, preferably, as those skilled in the art will appreciate.

While wall thicknesses of a container construction of the present invention can vary widely, as those skilled in the art will appreciate, typical wall thicknesses (exclusive of the handle region) fall in the range of from about 0.013 to 0.015 mils. Also, for illustration purposes, a lightweight one gallon plastic container such as container 15 can be fabricated with a polyethylene or a polypropylene so as to have a total weight in the range of about 45 grams (prior art lightweight gallon-size plastic bottles being in the range of 59 to 65 grams, a typical weight being 62 grams) while a container such as container 90, a half-gallon bottle, can be fabricated of similar polymeric resinous materials and have a weight of a similarly proportional less weight than known half-gallon bottle containers, though smaller and larger weights and wall thicknesses can be utilized in accordance with the spirit and scope of the present invention without departing therefrom. Of course, those skilled in the art will appreciate that, if a gallon bottle constructed in accordance with the invention can have a lowered total weight in the range of about 45 grams, then an inventively constructed half-gallon bottle, being necessarily smaller than the gallon container, can have a reduced total weight substantially less than 45 grams.

Referring to FIGS. 17 through 21, there is seen fragmentary views of alternative arrangements for ribbing structures of the type which are longitudinally defined in each one of the members of the opposed pair of curved corner portions located adjacent the one curved corner portion which has formed therein the hollow handle (in a plastic container construction of this invention). Each such ribbing structure in the embodiments shown in FIGS. 17-21 includes two matching ridge line members, designated as A and B, respectively, in each Figure for reasons of brevity and simplicity. Each such member A and B has at least two changes of radius of curvature. Each such ribbing structure (A plus B) extends in its respective associated curved corner portion C approximately from a position D of the container in spaced relationship to the mouth region E to top edge areas F of the curved base portion G. Each such ribbing structure (A plus B) has each of its respective two members A and B spaced laterally from the other thereof in mid-region H therealong, this lateral spacing is nondecreasing in the upward direction for at least substantial length portions of the ribbing structure and reaches a maximum in a location I which is situated generally between the bottom edge areas of the dome configured top portion D and the lower region J of the handle (when a container is viewed in side elevation).

In the case of the embodiment shown in FIGS. 17 through 19, the space between the individual members A and B is in the nature of a groove. In the case of the embodiment shown in FIG. 20, the region between the members A and B is raised to a level generally matching the contour of the container in the region of the associated curved corner portion.

In the case of the embodiment shown in FIG. 21, each ribbing structure (A plus B) can be regarded as being a composite of the type of ribbing structures employed in containers 15 and 90 hereinabove described, as those skilled in the art will appreciate. The interrelationship between the various components is illustrated more clearly in the vertical sectional view shown in FIG. 22. Each ridge member, such as A, is characterized by lip lines 102 and 103 positioned on either side of the groove or valley 104, such that the lip lines and groove extend the length of the ridge line member.

Referring to FIGS. 23 through 25, there is seen an extrusion blow molding apparatus including an extrusion die 105. The die has a nozzle 106 from which is extruded a tubular configuration of heated thermoplastic resin. When the length of the extrudate reaches a predetermined value, the respective blow mold halves 108 and 109 are actuated through the use of fluidic cylinders 110 and 111, respectively so that the mold halves 108 and 109 close around the extrudate 107, as those skilled in the art will appreciate. As the mold halves 108 and 109 close, the bottom of the tubular extrusion 107 is pinched off and sealed while the top thereof is formed into the mouth portion of a container. The container is blown.

It has been discovered in the art that, when a gallon-size bottle is thus produced, a thinning of the walls of the container characteristically occurs. This phenomena is due to the fact that, during blowing of the tubular extrudate, the material which moves laterally to the opposed corners adjacent the handle corner travels a greater distance and therefor is stretched farther. Observe that the container is clamped in a directional normal to such handle adjacent corners. There is no or minimal movement in the handle region or in the corner opposed to the handle region and there is very little movement in the plastic along the parting line in the molds.

Accordingly, the annular orifice of the die nozzle 106 is in fluid connection with a supply pipe 112 and is elliptical in cross-section as shown in exaggerated form in FIG. 25 to provide an extrudate with thickened wall sections 113 and 114 so arranged that, after blowing to the configuration of the blow mold cavity 115 a more uniform container wall thickness is provided throughout.

Particularly in larger sized embodiments of the present invention, such as one gallon milk containers or larger, it is preferred, as in the embodiment of container 15, to incorporate a thickening in the panel 47 in the position thereof immediately adjacent the handle 41 so as to impart added rigidity generally to the panel structure to avoid localized imperfections in wall members and corner portions of container 15 from developing, particularly during pouring operations.

When a label is to be added on a sidewall portion of a container of this invention, or printing is to be imposed thereon, or when it is desired to protect a container sidewall portion from abrasion during shipping and storage, it is convenient, and even preferred, to so locate and position sidewall portions that they have a backward tilt. Convenient backward tilt angles range from about 4° to 5°; see for example container 15.

As is apparent from the foregoing specification the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereotoappended claims.

I claim as my invention:

1. A one-piece molded plastic container construction having:

four upstanding sidewall portions symmetrically located about a common longitudinal axis, curved corner portions interconnecting adjacent side edge areas of respective sidewall portions, a bottom portion, curved base portions interconnecting adjacent bottom edge areas of respective said sidewall portions with adjacent edge areas of said bottom portion, a hollow handle formed generally in a region extending along a first of said curved corner portions and generally within the profile thereof, the portion of said handle intermediate the end portions being spaced by an aperture from a panel section which extends between the pair of sidewall portions adjoining said first curved corner portion, a top portion having a mouth region, which mouth region is coaxial with said longitudinal axis, said top portion being interconnected with adjacent top edge areas of respective sidewall portions, the upper end areas of said handle and said panel section being each interconnected with said top portion and the lower end area of said handle being interconnected with an upper portion of said first curved corner portion, and first and second ribbing structures, each one thereof being respectively defined longitudinally in opposed second and third said curved corner portions adjacent said first curved corner portion, each one of such ribbing structures including two matching ridge line members, each such ribbing structure extending in its respective associated curved corner portion approximately from a position in said top portion in spaced relationship to said mouth region at least to the top edge areas of said curved base portions, and each such ribbing structure having its respective two ridge line members spaced laterally from one another therealong, this lateral spacing is at a maximum in a location which is situated generally between said bottom edge areas of said top portion and said lower end area of said handle.

2. The container construction of claim 1 wherein, said top portion has a lesser radius of curvature where bottom edge areas of said top portion join respective top edge areas of said sidewall portions than where said bottom edge areas of said top portion join the top edge areas of said curved corner portions other than that of said first curved corner portion.

3. The container construction of claim 1 wherein there is incorporated further third and fourth ribbing structures, each one thereof being respectively defined as a closed loop that extends along a different outside edge of said handle and further extends about the perimeter of said panel section, each such ribbing structure including at least one ridge line member.

4. The container construction of claim 1 wherein there is incorporated further a trough defined in said bottom portion and extending diagonally thereacross between and including at least portions of the adjoining respective said curved base portions with opposed end portions of said trough adjoining respective bottom end portions of first and second ribbing structures.

5. A one-piece molded plastic container construction having:

four upstanding sidewall portions symmetrically located about a common longitudinal axis, curved corner portions interconnecting adjacent side edge areas of respective said sidewall portions, a bottom portion, curved base portions interconnecting adjacent bottom edge areas of respective said sidewall portions with adjacent edge areas of said bottom portion, a hollow handle formed generally in a region extending along a first of said curved corner portions and generally within the profile thereof, said handle having lower and upper end areas and a mid-portion, the mid-portion of said handle being spaced by an aperture from a panel section which extends between the pair of sidewall portions adjoining said first curved corner portion, a top portion having bottom edge areas and a mouth region coaxial with said longitudinal axis, said top portion having a lesser radius of curvature where the bottom edge areas of said top portion join respective top edge areas of said sidewall portions than where said bottom edge areas of said top portion join top edge areas of said curved corner portions other than that of said first curved corner portion, the upper end areas of said handle and said panel section being each interconnected with said top portion and the lower end area of said handle being interconnected with an upper portion of said first curved corner portion, first and second ribbing structures, each one thereof being respectively defined longitudinally in opposed second and third said curved corner portions adjacent said first curved corner portion, each one of such ribbing structures including two matching ridge line members, each such ribbing structure extending in its respective associated curved corner position approximately from a position in said top portion in spaced relationship to said mouth region at least to the top edge areas of said curved base portions, and each such ribbing structure having each of its respective matching ridge line members spaced laterally from the other therealong, this lateral spacing reaching a maximum in a location which is situated generally between bottom edge areas of said top portion and said lower end area of said handle, a second pair of ribbing structures, each one thereof being defined as a closed loop that extends along a different outside edge of said handle, and further extends around the perimeter of one side of said aperture in a different one of said pair of sidewall portions and in said top portion, each such ribbing structure including at least one ridge line member, and a trough defined in said bottom portion and extending diagonally thereacross between and including at least portions of the adjoining respective said curved base portions with opposed end portions of said trough adjoining the respective bottom end portion of each one of said first ribbing structures.

6. A lightweight one-piece molded plastic container comprising four sidewall portions defining centrally thereof a longitudinal axis, curved corner portions interconnecting adjacent sidewall portions, a bottom portion interconnected with lower edge areas of said sidewall and corner portions, a top portion interconnected with upper edge areas of said sidewall and corner portions, a handle extending along a first corner portion, and a ribbing structure formed respectively in opposed second and third corner portions adjacent said first corner portion, each one ribbing structure including two matching ridge line members spaced laterally from one another and both running longitudinally along the respective corner portion substantially parallel with one another beneath said handle and diverging away from one another upwardly adjacent said handle.

7. The lightweight plastic container of claim 6, wherein the lateral spacing between said matching ridge line members is nonuniform and reaches a maximum at a location laterally adjacent said handle.

8. The lightweight plastic container of claim 6, wherein the lateral spacing between said matching ridge line members is in the form of a generally smooth recessed wall surface.

9. The lightweight plastic container of claim 6, wherein said container is a gallon size bottle having a total empty weight in the range of about 50 grams.

10. The lightweight plastic container of claim 6, wherein said container is a half-gallon size bottle having a total empty weight substantially less than 45 grams.

11. The lightweight plastic container of claim 6, wherein each said ridge line member comprises a longitudinally extending groove bounded on opposed lateral sides by raised lip regions.

12. The lightweight plastic container of claim 11, wherein the lateral spacing between matching ridge line members generally conforms with the respective contour configuration of the respective curved corner portion.

13. The lightweight plastic container of claim 6, wherein said top portion being formed with a mouth opening coaxial with said longitudinal axis, the upper ends of said ribbing structures terminating beneath said mouth opening.

14. The lightweight plastic container of claim 13, wherein said container is a gallon size bottle.

15. The lightweight plastic container of claim 13, wherein said container is a half-gallon size bottle.

16. The lightweight plastic container of claim 6, further comprising a trough defined in said bottom portion and extending diagonally thereacross between said second and third curved corner portions and having opposed end portions respectively adjoining with the lower ends of each of said ribbing structures adjacent the lower edge areas of said second and third curved corner portions.

17. The lightweight plastic container of claim 16, wherein said container has a generally square-shaped plan profile.

18. The lightweight plastic container of claim 6, wherein said container has a generally square-shaped plan profile.

19. A lightweight one-piece molded plastic container comprising four sidewall portions defining centrally thereof a longitudinal axis, a plurality of corner portions interconnecting adjacent sidewall portions, a bottom portion interconnected with lower edge areas of said sidewall and corner portions, a top portion interconnected with upper edge areas of said sidewall and corner portions, a handle extending along a first corner portion, a ribbing structure formed respectively in opposed second and third corner portions adjacent said first corner portion, each one ribbing structure including at least one ridge line member, and the plan profile for a fourth corner portion, opposed from said first corner portion, being wider than that of the corresponding plan profile of said remaining three corner portions.

20. The lightweight plastic container of claim 19, wherein said corner portions have curved plan profiles, said fourth corner portion having a radius of curvature larger than that of said remaining corner portions.

21. The lightweight plastic container of claim 20, wherein the radius of curvature for each of said corner portions, other than the fourth corner portion, being generally equal.

22. The lightweight plastic container of claim 19, wherein said top portion being formed with a mouth opening coaxial with said longitudinal axis, the upper ends of said ribbing structures terminating beneath said mouth opening.

23. The lightweight plastic container of claim 22, wherein said container has a generally square-shaped plan profile.

24. The lightweight plastic container of claim 19, wherein each said ribbing structure comprises two ridge line members laterally spaced from one another and having matching configurations.

25. The lightweight plastic container of claim 24, wherein the lateral spacing between each two ridge line members is nonuniform and reaches a maximum at a location laterally adjacent said handle.

26. The lightweight plastic container of claim 25, further comprising a trough defined in said bottom portion and extending diagonally thereacross between said second and third curved corner portions and having opposed end portions respectively adjoining with the lower ends of each of said ribbing structures adjacent the lower edge areas of said second and third curved corner portions.

27. The lightweight plastic container of claim 25, further comprising a panel section which extends between the pair of sidewall portions adjoining said first curved corner portion, said handle being spaced along a portion thereof by an aperture from said panel section, and a symmetrical pair of circular ribbing structures, each one extending around a perimeter of said panel section and along an outside edge of said handle, said circular ribbing structures each including at least one annular ridge line member.

28. The lightweight plastic container of claim 27, further comprising first and second bead members located respectively along opposed outside edges of said panel section and each extending in a semi-circular arc having opposed free ends terminating adjacent the upper and lower end regions of said handle and positioned interiorly adjacent a corresponding one of said pair of circular ribbing structures.

29. The lightweight plastic container of claim 28, wherein said container is a gallon size bottle and has a generally square-shaped plan profile.

30. The lightweight plastic container of claim 24, wherein the lateral spacing between each two ribbing structure ridge line members is in the form of a generally smooth recessed wall surface.

31. The lightweight plastic container of claim 19 further comprising a trough defined in said bottom portion and extending diagonally thereacross between said second and third curved corner portions and having opposed end portions respectively adjoining with the lower ends of each of said ribbing structures adjacent the lower edge areas of said second and third curved corner portions.

32. The lightweight plastic container of claim 19, further comprising a panel section which extends between the pair of sidewall portions adjoining said first curved corner portion, said handle being spaced along a portion thereof by an aperture from said panel section, and a symmetrical pair of circular ribbing structures, each one extending around a perimeter of said panel section and along an outside edge of said handle, said circular ribbing structures each including at least one annular ridge line member.

33. The lightweight plastic container of claim 32, further comprising first and second bead members located respectively along opposed outside edges of said panel section and each extending in a semicircular arc having opposed free ends terminating adjacent the upper and lower end regions of said handle and positioned interiorly adjacent a corresponding one of said pair of circular ribbing structures.

34. The lightweight plastic container of claim 32, wherein said container has a generally square-shaped plan profile.

35. The lightweight plastic container of claim 19, wherein said top portion has lesser radii of curvature where said top portion joins with upper edge areas of said sidewall portions than where said top portion joins with upper edge areas of said curved corner portions.

36. The lightweight plastic container of claim 19, further comprising a panel section which extends between the pair of sidewall portions adjoining said first curved corner portion, said handle extending coaxially along said first curved corner portion and being spaced over along a portion thereof by an aperture from said panel section, and wherein each said ribbing structure comprises two ridge line members laterally spaced from one another and having matching configurations.

37. The lightweight plastic container of claim 36, wherein the lateral spacing between each two ridge line members is nonuniform and reaches a maximum at a location laterally adjacent said handle.

38. The lightweight plastic container of claim 37, wherein each said lateral spacing reaches a maximum at a location laterally across from said aperture.

39. A lightweight one-piece molded plastic container comprising four sidewall portions defining centrally thereof a longitudinal axis, curved corner portions interconnecting adjacent sidewall portions, a bottom portion interconnected with lower edge areas of said sidewall and corner portions, a top portion interconnected with upper edge areas of said sidewall and corner portions and being formed with a mouth opening, a handle extending along a first corner portion, a raised, substantially planar, panel section extending between the pair of sidewall portions adjoining said first corner portion, said handle being spaced along a portion thereof by an aperture from said panel section, and first and second bead-shaped discontinuities located on said panel section respectively over and along laterally opposed outer edges thereof.

40. The lightweight plastic container of claim 39, further comprising a ribbing structure formed respectively in opposed second and third corner portions adjacent said first corner portion.

41. The lightweight plastic container of claim 40, wherein the radius of curvature for a fourth curved corner portion, opposed from said first curved corner portion, is larger than that of the corresponding curvatures of said remaining three curved corner portions.

42. The lightweight plastic container of claim 41, wherein the radius of curvature for each of said curved corner portions, other than the fourth curved corner portion, being generally equal.

43. The lightweight plastic container of claim 40, wherein each one ribbing structure includes two matching ridge line members spaced laterally from one another and both running longitudinally along the respective corner portion.

44. The lightweight plastic container of claim 43, wherein the lateral spacing between each two ridge line members is nonuniform and reaches a maximum at a location laterally adjacent said handle.

45. The lightweight plastic container of claim 44, wherein each said lateral spacing reaches a maximum at a location laterally across from said aperture.

46. The lightweight plastic container of claim 43, further comprising a trough defined in said bottom portion and extending diagonally thereacross between said second and third curved corner portions and having opposed end portions respectively adjoining with the lower ends of each of said ribbing structures adjacent the lower edge areas of said second and third curved corner portions.

47. The lightweight plastic container of claim 39, wherein each bead-shaped discontinuity extends in a semi-circular arc having opposed free ends terminating adjacent upper and lower end regions of said handle.

48. The lightweight plastic container of claim 39, wherein said container has a generally square-shaped plan profile.

49. The lightweight plastic container of claim 39, wherein each said bead-shaped discontinuity is in the form of a raised wire-shaped projection.

50. The lightweight plastic container of claim 39, wherein each said bead-shaped discontinuity is in the form of a groove.

51. The lightweight plastic container of claim 39, wherein said container is a gallon size bottle.

52. A lightweight one-piece blow-molded plastic bottle, having a volume of substantially one gallon and weighing 55 grams or less, comprising four sidewall portions defining centrally thereof a longitudinal axis, curved corner portions interconnecting adjacent sidewall portions, a bottom portion interconnected with lower edge areas of said sidewall and corner portions, a top portion interconnected with upper edge areas of said sidewall and corner portions, a handle extending along a first corner portion, a ribbing structure formed respectively in opposed second and third corner portions adjacent said first corner portion, each one ribbing structure including two matching ridge line members spaced from one another.

53. The lightweight plastic bottle of claim 52, wherein said ridge line members of each ribbing structure run longitudinally of the corresponding corner portion and are spaced laterally from one another.

54. The lightweight plastic bottle of claim 53, wherein the lateral spacing between each two ridge line members is nonuniform and reaches a maximum at a location laterally adjacent said handle.

55. The lightweight plastic bottle of claim 53, wherein said bottle weighs about 45 grams.

56. The lightweight plastic bottle of claim 52, further comprising a trough defined in said bottom portion and extending diagonally thereacross between said second and third corner portions and having opposed end portions respectively adjoining with the lower ends of each of said ribbing structures adjacent the lower edge areas of said second and third corner portions.

57. The lightweight plastic bottle of claim 52, wherein the radius of curvature for a fourth corner portion, opposed from said first corner portion, is larger than that of the corresponding curvatures of said remaining three corner portions.

58. A lightweight one-piece blow-molded plastic bottle, having a volume of substantially one half gallon and weighing substantially less than 45 grams, comprising four sidewall portions defining centrally thereof a longitudinal axis, curved corner portions interconnecting adjacent sidewall portions, a bottom portion interconnected with lower edge areas of said sidewall and corner portions, a top portion interconnected with upper edge areas of said sidewall and corner portions, a handle extending along a first corner portion, a ribbing structure formed respectively in opposed second and third corner portions adjacent said first corner portion, each one ribbing structure including two matching ridge line members spaced from one another.

59. The lightweight plastic bottle of claim 58, wherein said ridge line members of each ribbing structure run longitudinally of the corresponding corner portion and are spaced laterally from one another.

60. The lightweight plastic bottle of claim 59, wherein the lateral spacing between each two ridge line members is nonuniform and reaches a maximum at a location laterally adjacent said handle.

61. The lightweight plastic bottle of claim 58, further comprising a trough defined in said bottom portion and extending diagonally thereacross between said second and third corner portions and having opposed end portions respectively adjoining with the lower ends of each of said ribbing structures adjacent the lower edge areas of said second and third corner portions.

62. The lightweight plastic bottle of claim 58, wherein the radius of curvature for a fourth corner portion, opposed from said first corner portion, is larger than that of the corresponding curvatures of said remaining three corner portions.

* * * * *